(12) United States Patent
Miller et al.

(10) Patent No.: US 9,476,673 B2
(45) Date of Patent: Oct. 25, 2016

(54) METHOD OF LOCKING A HANDGUARD TO AN UPPER RECEIVER OF A FIREARM

(71) Applicant: Mega Arms, LLC, Centralia, WA (US)

(72) Inventors: Michael A. Miller, Tenino, WA (US); James E. Reid, Tenino, WA (US)

( * ) Notice: Subject to any disclaimer, the term of this patent is extended or adjusted under 35 U.S.C. 154(b) by 0 days.

(21) Appl. No.: 15/059,137

(22) Filed: Mar. 2, 2016

(65) Prior Publication Data

US 2016/0178316 A1    Jun. 23, 2016

Related U.S. Application Data

(62) Division of application No. 14/502,702, filed on Sep. 30, 2014, now Pat. No. 9,335,117.

(51) Int. Cl.
*F41C 23/16* (2006.01)
*F16B 39/04* (2006.01)

(52) U.S. Cl.
CPC .............. *F41C 23/16* (2013.01); *F16B 39/04* (2013.01)

(58) Field of Classification Search
CPC ......... F41C 23/16; F41C 23/00; F41A 21/48
USPC ......... 42/75.02, 90, 75.01, 75.03, 71.01, 72, 42/73
See application file for complete search history.

(56) References Cited

U.S. PATENT DOCUMENTS

| | | | | |
|---|---|---|---|---|
| 3,421,726 A | * | 1/1969 | Getter .................. | B60P 7/0807 296/43 |
| 4,311,420 A | * | 1/1982 | Hendricks ............. | B60P 7/0892 410/116 |
| 7,770,317 B1 | * | 8/2010 | Tankersley ............. | F41C 23/16 42/71.01 |
| 8,037,633 B1 | * | 10/2011 | Troy ....................... | F41C 23/16 42/71.01 |
| 8,234,808 B2 | * | 8/2012 | Lewis ..................... | F41A 3/26 42/71.01 |
| 8,464,457 B2 | * | 6/2013 | Troy ....................... | F41C 23/16 42/71.01 |
| 8,769,853 B1 | * | 7/2014 | LaRue ................... | F41C 23/16 42/71.01 |
| 8,904,691 B1 | * | 12/2014 | Kincel ................... | F41C 23/16 42/71.01 |
| 2011/0119981 A1 | * | 5/2011 | Larue ..................... | F41C 23/16 42/71.01 |
| 2011/0126443 A1 | * | 6/2011 | Sirois .................... | F41C 23/16 42/90 |
| 2012/0186123 A1 | * | 7/2012 | Troy ....................... | F41G 11/003 42/71.01 |
| 2012/0324775 A1 | * | 12/2012 | Troy ....................... | F41C 23/16 42/71.01 |

* cited by examiner

*Primary Examiner* — Jonathan C Weber
(74) *Attorney, Agent, or Firm* — Miller Nash Graham & Dunn LLP; Kathleen T. Petrich

(57) ABSTRACT

A method of locking a handguard relative to an upper receiver of a firearm. The method includes providing a wedge assembly having a top wedge member and a bottom wedge member, each having complementary inclined surfaces; a barrel nut that is configured to receive an outer portion of an upper receiver; and a handguard that is configured to receive the barrel nut and the combined wedge assembly within a lower lip of the handguard. The wedge assembly may include an optional assembly screw and a locator pin where the top wedge member and bottom wedge member are tightly joined to each other via the assembly screw and the locator pin. In use, the lock-up system is used to join the handguard and barrel nut to a corresponding upper receiver with little to no play between the handguard and the upper receiver such that the connection between the two via the wedge assembly is intended to be permanent.

10 Claims, 8 Drawing Sheets

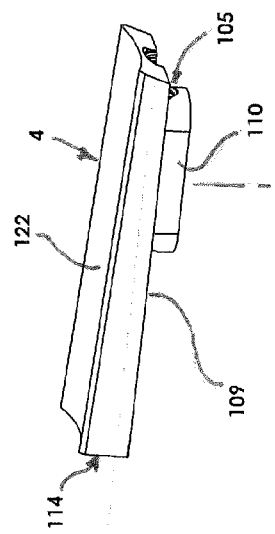
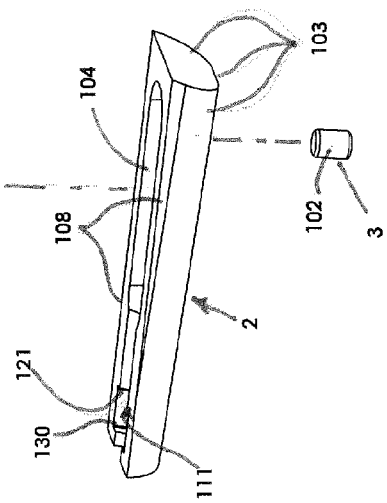
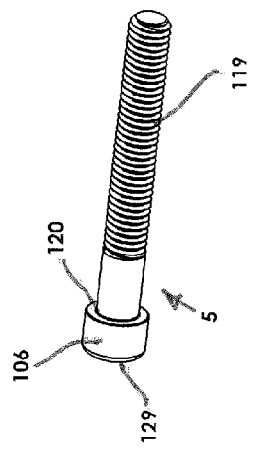
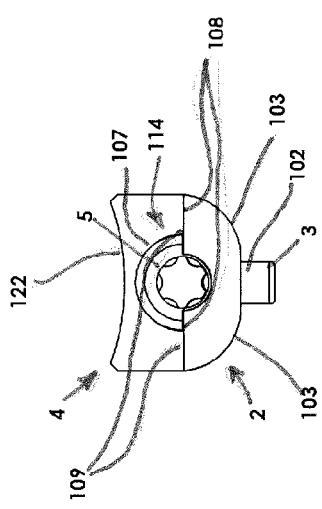
FIGURE 6
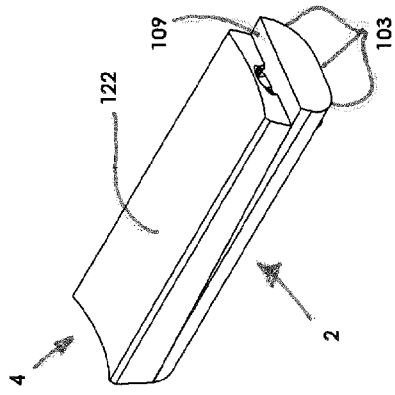
FIGURE 7
FIGURE 8

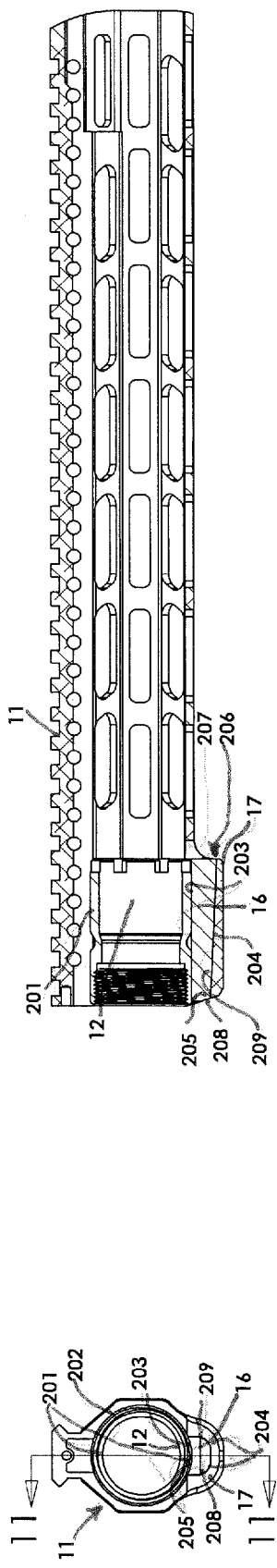
FIGURE 11
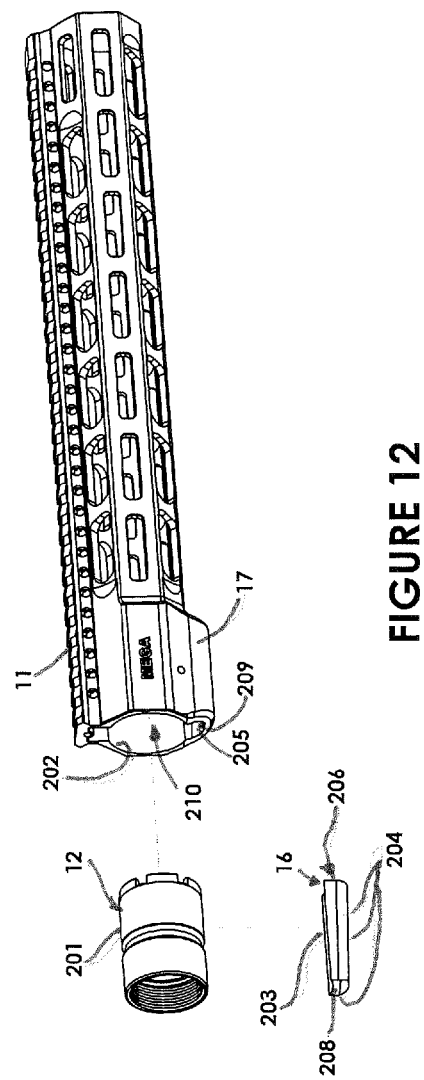
FIGURE 12
FIGURE 10

METHOD OF LOCKING A HANDGUARD TO AN UPPER RECEIVER OF A FIREARM

RELATED APPLICATION

This application is a divisional of U.S. patent application Ser. No. 14/502,702, filed Sep. 30, 2014, entitled "Lock Up System for a Handguard," the contents of which are fully incorporated herein by reference.

TECHNICAL FIELD

The present invention relates to a method of locking a handguard to an upper receiver of a firearm.

BACKGROUND OF THE INVENTION

Firearms, particularly high caliber rifles, are manufactured in various components, such as an upper receiver that includes a barrel nut and its corresponding barrel extension, a barrel (discharge end), a bolt carrier, a lower receiver, a butt stock, a trigger, and a handguard.

Handguards are popular components of many firearms, particularly AR 15 rifles and military M16s. Handguards extend over the firearm barrel and allow a firearm user to help align the barrel end of the firearm without touching a hot barrel after discharge. Further, handguards generally contain a plurality of external openings in which accessories, like scopes and level devices, can be attached.

Handguards generally butt up to and are aligned with the upper receiver. It is desirable to have the connection between a handguard and its corresponding upper receiver be as tight and permanent as possible. However, handguards do not always align end to end as desired and lock up with their corresponding upper receiver and there is resulting "play" between the two components. One option is to buy a one-piece upper receiver/handguard, such as disclosed in U.S. Pat. No. 8,234,808 to Lewis. But manufacturers and OEM manufacturers and some end users like to buy separate handguards and assemble the handguard to the upper receiver post-OEM or in the field. The current known locking systems are bulky in size, difficult to assemble, require laborious timing of the assembly to the upper receiver and can be difficult to remove for updating and maintenance of the rifle.

BRIEF SUMMARY OF THE INVENTION

The present invention is directed to an innovative solution for providing a lock-up device, a lock-up system that combines a handguard with the lock-up device, and a method for near permanently joining a handguard to a corresponding upper receiver via a barrel nut assembly and the lock-up device.

According to one aspect of the present invention, the lock-up system is directed to a handguard, a barrel nut, and a wedge assembly.

The handguard has a first end and a second end with a bore therethrough. The bore is configured to receive the barrel nut. The second end also has a lower lip that is adjacent to the bore. The lower lip has an interior surface that is configured to receive the wedge assembly.

The barrel nut is configured to receive a barrel of a firearm. The barrel nut has a first end and a second end. The second end is configured to receive a portion of an upper receiver. The first end of the barrel nut has an outer surface that is configured to be received within the bore. The outer surface may be cylindrical in shape.

The wedge assembly includes a top wedge and a bottom wedge. The upper surface of the top wedge has a generally indented surface, which may be concave in shape. The generally indent surface of the top wedge is configured to be biased against the outer surface of the barrel nut. The lower surface of the top wedge is inclined. The bottom wedge has a lower surface configured to be received into and confront the interior portion of the lower lip of the handguard. The upper surface of the bottom wedge is inclined, complementary to the incline of the lower surface of the top wedge.

According to another aspect of the present invention, the lock-up system is directed to a combined handguard, upper receiver, barrel nut, and wedge assembly. The barrel nut is affixed to a portion of the upper receiver. Both the upper receiver and handguard have outer edges that closely confront each other in use. The upper receiver has a first end and a second end where the first end closely confronts the second end of the handguard with the barrel nut therebetween mostly positioned within the bore of the handguard. The locked-up handguard and upper receiver may look like a unitary member when assembled.

The lock-up system may include an optional assembly screw and locator pin. The optional assembly screw is configured to be positioned within a slot of the inclined upper surface of the bottom wedge and a slot that is abutted by a key in the lower inclined surface of the top wedge. The screw may be tightened to bring and retain the top and bottom wedges into close contact. The locator pin may be used to guide and retain the relative position of the top wedge relative to the bottom wedge. The locator pin is configured to be received within an aperture within the bottom wedge from the lower surface to the inclined surface.

Another embodiment includes a wedge assembly having an upper generally indented surface and a lower inclined (angled) surface that is configured to be received within a complementary inclined (angled) interior surface of a lower lip of the handguard. The alternate embodiment wedge assembly may be unitary in construction.

Optional fastener or fasteners may be used to retain an exterior portion of the handguard relative to the inserted outer surface of the barrel nut.

The present invention also includes a method of locking-up a handguard relative to a corresponding upper receiver. The method includes providing a handguard configured as discussed above. A barrel nut, such as described above is affixed to an external portion of the upper receiver that has outer edges that conform to outer edges of the second end of the handguard. The wedge assembly, as discussed above, is positioned within the lower lip of the handguard with the respective inclined surfaces of the top and bottom wedge in a closely confronting relationship. The two inclined surfaces slide against each other to provide tension and pressure. The bore and indented upper surface of the top wedge, now combined and inserted within the lower lip of the handguard, forms a hollow that conforms to the outer edge of the barrel nut. The barrel nut is squeezed into the hollow space between the upper surface of the top wedge and within the bore. One or more fasteners may be optionally added to secure the wedge to the handguard and the barrel nut outer surface to the handguard.

The method of locking-up the handguard relative to the corresponding upper receiver may include the alternate embodiment where the wedge assembly is optionally unitary in nature so that the pressure is maintained when the lower angled surface of the (preferably unitary) wedge assembly is inserted within a handguard that has a lower lip interior surface that has a complementary angled surface to the lower angled surface of the wedge assembly.

Similar to the system embodiments, the method may include tightening an optional assembly screw, as well as an optional locator pin to provide further tension and to tighten the bottom wedge to the top wedge.

Another optional feature is a partial aperture within each outer edge of the handguard and upper receiver, respectively. The partial aperture is aligned with the corresponding aperture of the other respective member (handguard or upper receiver). The combined entire aperture may incorporate an alignment pin that aligns the upper receiver and the handguard.

In this way, the physical connection between the wedge assembly, handguard, and barrel nut is secure and intended to be permanent.

These and other advantages are discussed and/or illustrated in more detail in the DRAWINGS, the CLAIMS, and the DETAILED DESCRIPTION OF THE INVENTION.

BRIEF DESCRIPTION OF THE DRAWINGS

The accompanying figures, which are incorporated in and constitute a part of this specification, illustrate various exemplary embodiments.

Like reference numerals are used to designate like parts throughout the several view of the drawings, wherein:

FIG. 6 is a left end elevational view of the combined wedge assembly;

FIG. 7 is a front right end perspective view of the combined wedge assembly;

FIG. 8 is an unassembled perspective view of the wedge assembly;

FIG. 10 is a right end elevational view of an alternate embodiment wedge assembly inserted into a handguard;

FIG. 11 is a front section view of an assembled handguard, barrel nut, and alternate embodiment combined wedge assembly taken substantially across lines 11-11 of FIG. 10;

FIG. 12 is an exploded perspective view of the handguard, barrel nut, and alternate embodiment combined wedge assembly.

DETAILED DESCRIPTION OF THE INVENTION

Figure 1:
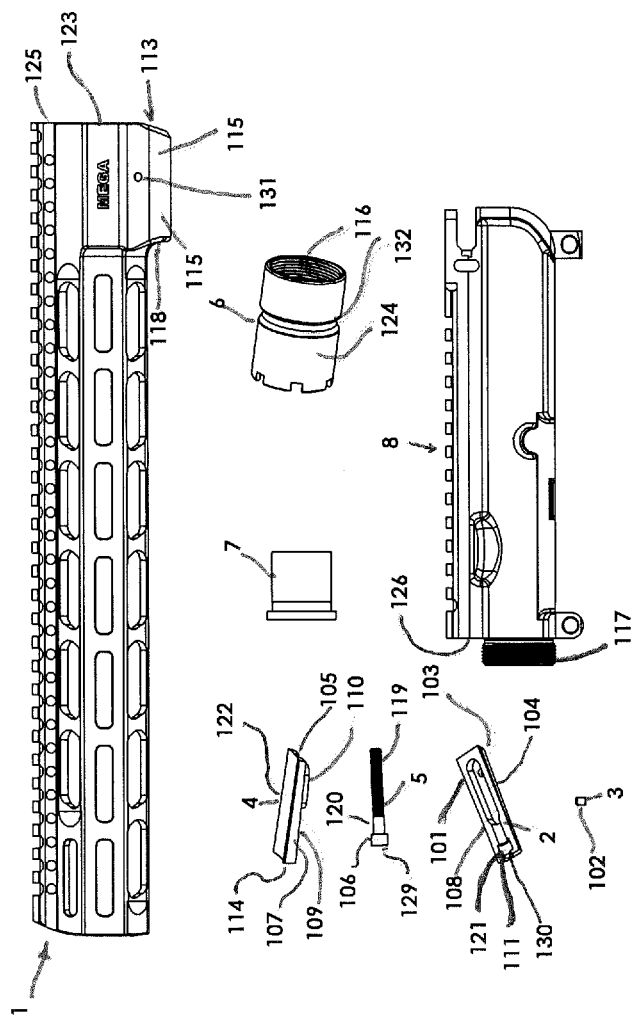
FIG. 1 is an exploded perspective view of a lock-up system that can include a handguard, a barrel nut, and a lock-up device and where the lock-up device includes a top wedge member, a lower wedge member, and an optional assembly screw and where the lock-up system is used to permanently join the handguard to a corresponding upper receiver and a corresponding barrel extension.
Figure 3:
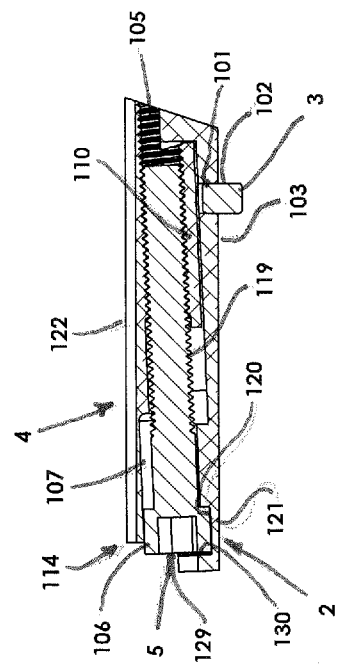
FIG. 3 is a section view of the lock-up device taken along section lines 3-3 of FIG. 2.

Referring to FIGS. 1-9, according to one embodiment of the invention, the lock-up system of the present invention consists of a handguard 1, a bottom wedge 2, a locator pin 3, a top wedge 4, an assembly screw 5, and a barrel nut 6. The lock-up system is designed to attach to any milspec upper receiver 8 and barrel extension 7, illustrated in FIG. 1.

Locator pin 3 is pressed into a hole 101 of bottom wedge 2 such that a diameter 102 of locator pin 3 protrudes from a lower surface 103 of bottom wedge 2, but not into a slot 104. Assembly screw 5 is inserted into a threaded a hole 105 of top wedge 4 such that a diameter 106 of assembly screw 5 engages an elongated diameter 107 of top wedge 4. Top wedge 4 and assembly screw 5 now engage bottom wedge 2 with assembled locator pin 3 such that an inclined (angled) surface 108 of the bottom wedge 2, and a complementary inclined (angled) surface 109 of the top wedge 4 are in direct contact, and a key 110 of top wedge 4 corresponds to and is positioned within slot 104 of bottom wedge 2. Further, assembly screw diameter 106 is captured within a cutout 111 of bottom wedge 2.

Figure 2:
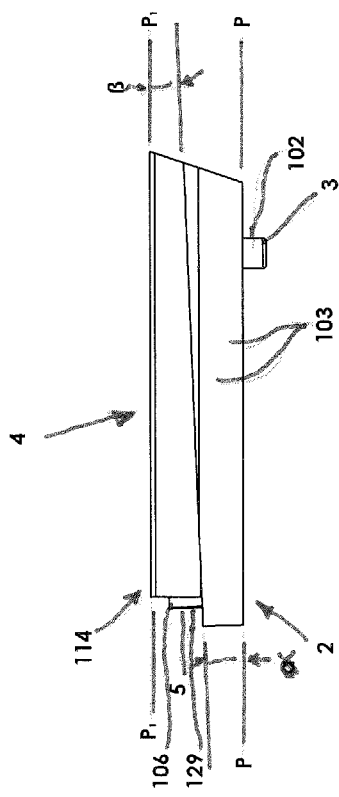
FIG. 2 is front assembled view of a combined wedge assembly, comprising the top wedge member, lower wedge member, and optional assembly screw of FIG. 1.

Referring to FIG. 2, the inclined surface of the bottom wedge may be an angle $\alpha$ in the range of 0.5 to 85 degrees, with a preferred range of 1.5 to 4 degrees as measured from an imaginary plane P-P. The top wedge's complementary inclined surface angle $\beta$ would be in the range of 0.5 to 85 degrees, with a preferred range of 1.5 to 4 degrees as measured from an imaginary plane $P_1$-$P_1$. According to one aspect of the present invention, the angle of the inclined lower surface of the top wedge and the angle of the inclined upper surface of the bottom wedge are equal or substantially so that the overall profile of the combined wedge assembly is generally rectangular in shape.

Figure 4:
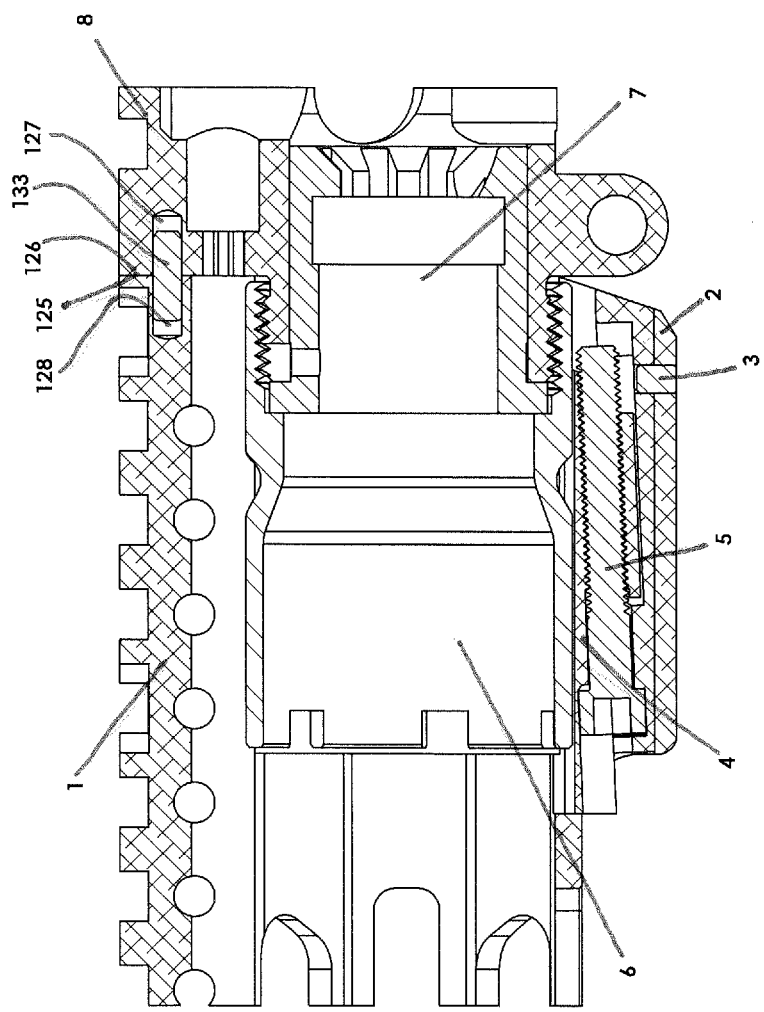
FIG. 4 is a section view of a portion of the combined wedge assembly of FIG. 2 positioned between the handguard and the barrel nut, which is received onto threads of the upper receiver of FIG. 1.
Figure 5:
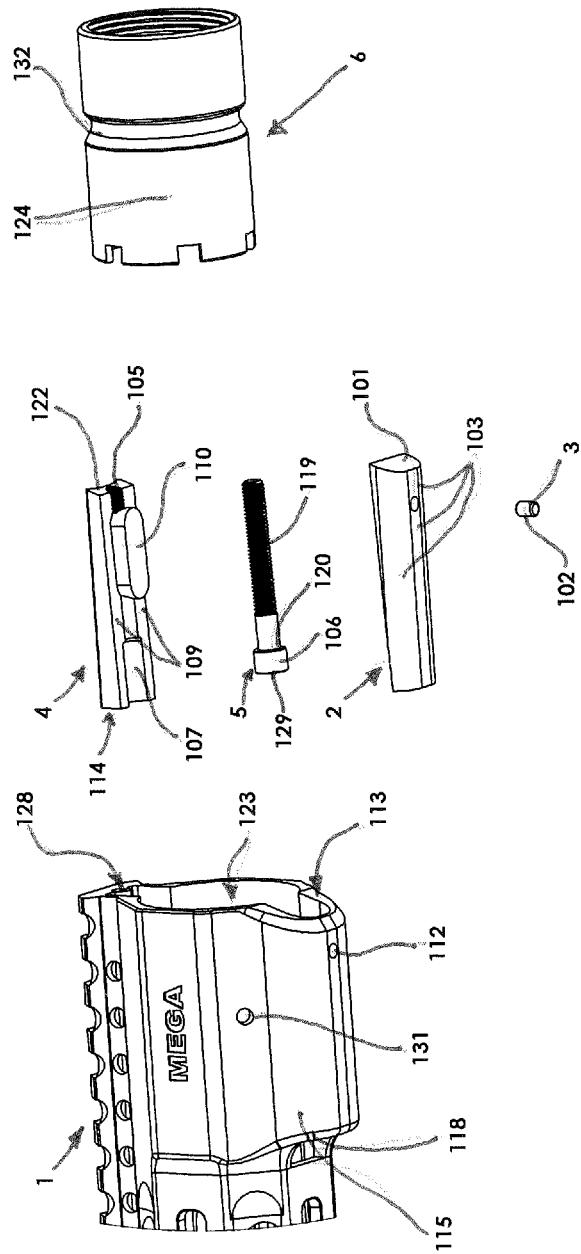
FIG. 5 is an unassembled perspective view of the combined wedge assembly, the barrel nut, and a portion of the handguard.
Figure 9:
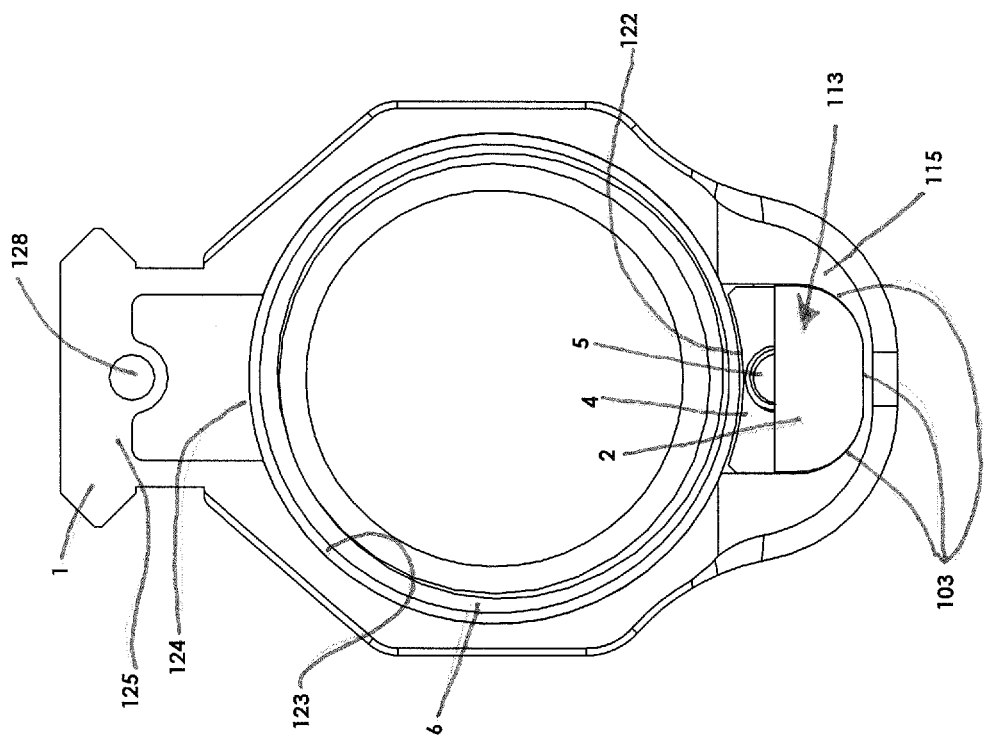
FIG. 9 is a right end elevational view of the combined wedge assembly inserted into the handguard.
Figure 13:
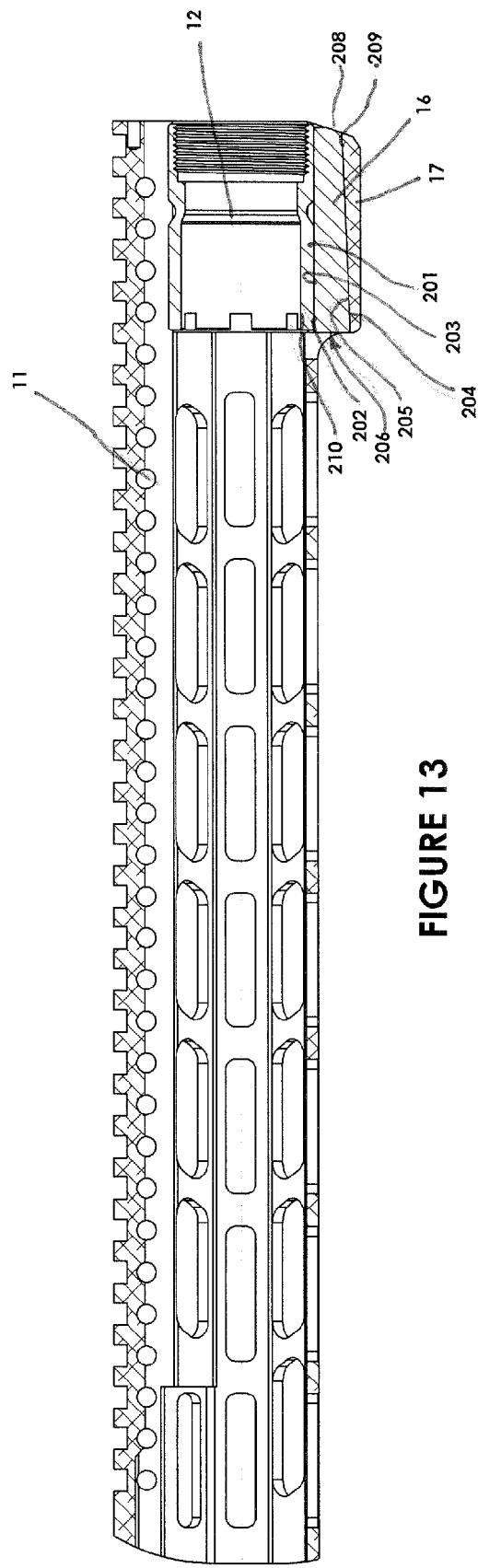
FIG. 13 is a rear section view of the assembled handguard, barrel nut, and alternate embodiment of FIG. 11.

Referring particularly to FIGS. 4 and 5, the complete wedge assembly (FIGS. 2 and 3) with bottom wedge 2, top wedge 4, locator pin 3, and assembly screw 5 can now be assembled into handguard 1. The assembly aligns by locating diameter 102 of locator pin 3 into an opening 112 of handguard 1. Lower surface 103 of bottom wedge 2 seats into a lower lip 115 of handguard 1. Lower lip 115 defines an interior slot 113 that is accessed through an opening of the handguard. A flat front 114 of top wedge 4 is brought into close proximity of slot 113/opening of handguard 1.

In use, barrel nut 6 will be fastened onto upper receiver 8 by threads 116 of the barrel nut 6 and threads 117 of the upper receiver 8, thereby holding the barrel extension 7 in place along with any firearm barrel received therein. Holding the wedge assembly (FIG. 2) into position, a wrench may be inserted through opening 118 in the handguard 1, thereby adjusting the assembly screw 5. By turning the assembly screw in a clockwise direction, the screw threads 119 are drawn into the threaded hole 105 of the top wedge 4. As this proceeds, the screw head surface 120 contacts the capture surface 121 of the bottom wedge 2 in such a way as to impede movement of said screw, independent of the bottom wedge 2. Since the assembly screw can move no further, being stopped against the capture surface 121 on the bottom wedge 2, further clockwise rotation of the assembly screw 5 results in motion of the top wedge 4 toward the surface 120 of the assembly screw.

The two wedges are held in constant contact by an assembler, causing the surface 108 of the bottom wedge 2 and the surface 109 of the top wedge 4 to be held in contact.

The motion of the top wedge 4, relative to the bottom wedge 2, commences when assembly screw 5 is turned clockwise. As the smallest ends of each wedge move toward each other, a generally indented, preferably concave, surface 122 of the top wedge 4 moves into closer proximity of the lower surface 103 of the bottom wedge 2. In general, this means that the concave surface 122 of the top wedge 4 is receding from the open diameter 123 of the handguard 1. As this loosening of the wedge continues, the top wedge 4 moves in such a way as to bring its forward surface 114 into contact with the interior surface of lower lip 115 of the handguard 1. A small amount of pressure can be created between these two surfaces (surface 114 and interior surface of lower lip 115) by continuing to rotate the assembly screw 5 clockwise a few degrees beyond the point wherein the surface 114 and the interior surface of lower lip 115 are brought into contact causing the wedge to seat itself open and held in position for assembly and confrontation with the barrel nut 6. At this time, an assembler releases hold of the wedge assembly (FIG. 2), as it is now self-retained.

With the conditions described it is now possible to slide the handguard 1 with wedge assembly (FIG. 2) over the barrel nut 6, which is threaded onto the threaded end of upper receiver 8. The handguard diameter 123, which is fashioned to be slightly larger than the diameter 124 of the barrel nut 6, together with the wedge assembly surface 122, now forms a relative (e.g., cylindrical) hollow that corresponds to the outer surface diameter) 124 of the barrel nut 6. The handguard 1, in combination with the wedge assembly (FIG. 2), now slides onto the barrel nut 6 until confronting contact is made between the handguard 1 and the upper receiver 8 along their respective flat outer edges (125, 126 of FIGS. 1 and 4). Some form of alignment may be made at this time, such that the addition of an alignment pin 133 extending between aperture 127 and corresponding aperture 128 of the upper receiver 8 and handguard 1, respectively.

Once confronting contact is made between the upper receiver 8 and the handguard 1, a wrench may be once again inserted through the handguard opening 118 to access assembly screw 5. By rotating the screw counter-clockwise, a relatively small reverse in the motion of the wedges 2, 4 may be achieved when the surface 129 of assembly screw 5 and the capture surface 130 of bottom wedge 2 make contact. Now the assembly screw 5 will not move independent of the bottom wedge 2 as a result of these two surfaces making confrontational contact. The threaded portion of the top wedge 4 will move away from the head of said screw and down the length of the assembly screw's threaded portion 119. The relative motion of the two wedges results in the larger ends of each wedge moving closer to each other. Concave upper surface 122 of top wedge 4 and lower surface 103 of bottom wedge 2 move away from each other. As this happens, the concave surface has already been put into biasing contact with the cylindrical diameter 124 of barrel nut 6 as the concave upper surface 122 of top wedge 4 moves toward the relative center of the diameter 123 of handguard 1. A squeezing force is applied to the outer diameter 124 of the barrel nut 6. This squeezing force between the handguard inner diameter 123 and the concave upper surface 122 of top wedge 4 that is applied to the outer diameter 124 of the barrel nut 6 affixes the handguard to the barrel nut, holding the relationship between the handguard 1 and the upper receiver 8 near permanently.

Once the attachment is completed further fasteners can be applied if desired. Two threaded holes 131 are applied to the sides of the handguard 1 in such a way as to be related to the diameter 123 near the middle of the features' longitudinal length. Two set screws can be threaded into these holes such that they protrude into the inner diameter 123 of the handguard 1 and intersect a radial cut 132 of the barrel nut 6. The radial cut 132 of barrel nut 6 is angled back toward the upper receiver 8. As these set screws are tightened into the radial groove 132, they tend to slide down its angle, being forced toward upper receiver 8. The result is that handguard 1 is forced toward the upper receiver 8. No further movement of the handguard toward the upper receiver is possible as the two outer edges 125, 126 of handguard 1 and upper receiver 8, respectively, are already in confronting contact with each other. This additional force has the added benefit of resisting any possible movement of the handguard 1 off of the barrel nut 6.

There are many possible methods of employing wedge surfaces to achieve handguard lock-up of a handguard to a receiver. Above described is a serviceable design and method to achieve this end, but many variations of the wedge surface, its angle, shape, location, and interrelationship to the handguard, barrel nut, and receiver can be created.

Many possible permutations of the invention exist. One such permutation is an alternate embodiment illustrated in FIGS. 10-13.

In this embodiment, handguard 11, which is substantially the same as handguard 1, is brought into contact with barrel nut 12 along cylindrical surface 201 of barrel nut 12 and cylindrical surface 202 of handguard 11. Handguard 11 has a first end and a second end with a bore 210 therebetween. Similar to the first embodiment, handguard 11 has a lower lip 17 with an interior surface 209 that is configured to receive a wedge assembly 16 via end 206 of wedge assembly 16.

Barrel nut 12 is substantially the same as barrel nut 6 in the first embodiment. Barrel nut 12 has a first end and a second end where the first end is configured to receive a portion of an upper receiver (not illustrated in FIGS. 10-13) and a second end has an outer surface (e.g., a cylindrical surface) 201 that is configured to be received axially within bore 210 of the handguard and directly above the lower lip. The interior surface of the lower lip has an inclined surface or surfaces 205 that is complementary to the lower surface(s) 204 of wedge assembly 16.

The wedge assembly 16 in this embodiment is different in that it does not need an assembly screw, a key/slot combination, or a locator pin. Rather, the wedge assembly has an upper generally indented (e.g., concave) surface 203 and an inclined lower surface 204 that is complementary to the inclined surface 205 of handguard 11. The angles of the inclined surfaces 205 (handguard) and wedge lower surface 204 may be in the same general angled ranges as those discussed in the first embodiment.

Concave surface 203 is placed in near contact with cylindrical surface 201 of barrel nut 12, and inclined surface or surfaces 204 of wedge assembly 16 are simultaneously brought into contact with inclined surface or surfaces 205 of handguard 11 lower lip 17. In this case, end surface 206 of wedge assembly 16 would begin in its loosened condition in near or exact contact with abutting surface 207 of handguard 11. As assembly proceeds, opposite end surface 208 of wedge assembly 16 would move rearward toward leading edge surface 209 of handguard 11. As this action continues, wedge assembly 16 slides across the contact between its inclined surfaces 204 and the inclined surfaces 205 of handguard 11, causing generally indented (e.g., concave) surface 203 to approach, contact and then pressure the outer (e.g., cylindrical) surface 201 of barrel nut 12. This pressure exerted effectively causes lock-up of the handguard, wedge and barrel nut.

The present invention may include other variants such as a tapered pin and conical slot as an alternate to the first embodiment. In such a variant, the slot would exist in both the barrel nut and handguard, to which the tapered pin could be applied to bring about said wedge pressure to cause handguard to receiver lock-up.

These few examples and embodiments, which are by no means exhaustive, are merely intended to illustrate some of the many variations that can occur without departing from the spirit of the invention.

Therefore it is the Applicant's intention that its patent rights not be limited by the particular embodiments illustrated and described herein, but rather by the following claims interpreted according to accepted doctrines of claim interpretation, including the Doctrine of Equivalents and Reversal of Parts.

The invention claimed is:

1. A method of locking a handguard of a firearm to a corresponding upper receiver; the method comprising:
   providing an upper receiver of a firearm having a first end and a second end; the first end having outer edges and an outwardly extending threaded portion;
   providing a handguard having a first end and a second end with a bore therebetween; the second end having outer edges that are configured to closely confront the outer edges of the upper receiver; the bore is configured to receive the outwardly extending threaded portion of the upper receiver; the handguard further configured to include a lower lip at the first end, the lower lip having an interior surface;
   providing a barrel nut having a first end and a second end, said second end configured to receive the outwardly extending threaded portion of the upper receiver and the first end configured to receive a barrel of a firearm; the barrel nut having an outer surface at the first end;
   providing a wedge assembly having a top wedge with an upper generally indented surface and a lower inclined surface, and a bottom wedge with an upper inclined surface inversely complementary to the inclined surface of the top wedge and a lower surface configured to be received and confront the interior surface of the lower lip of the handguard;
   securing the second end of the barrel nut to the threaded portion of the upper receiver;
   sliding the top wedge into contact with the bottom wedge at their respective inclined surfaces and joining the wedge assembly together to form a combined wedge assembly where the two respective inclined surfaces are closely confronting each other;
   positioning the combined wedge assembly within the interior portion of the lower lip of the handguard with the upper indented surface of the top wedge forming a hollow that is configured to closely receive the outer surface of the barrel nut;
   squeezing the outer surface of the barrel nut into the hollow of the handguard; and
   aligning and confronting the two outer edges of the handguard and upper receiver.

2. The method according to claim 1 wherein the outer edges of the respective upper receiver and handguard each include a complementary portion of an aperture that is configured to form one unitary aperture and receive an alignment pin when the two outer surfaces are brought into confronting contact with each other.

3. The method according to claim 1 wherein the generally indented upper surface of the top wedge is concave in shape and the outer surface of the barrel nut is cylindrical in shape.

4. The method according to claim 1 wherein the wedge assembly further comprises an assembly screw that is configured to be received within a slot of the bottom wedge within the inclined surface and drawn into a threaded hole of the top wedge; and
   wherein the assembly screw is tightened to tightly join the top wedge to the bottom wedge.

5. The method according to claim 4 wherein a locator pin is secured into an aperture of the lower surface of the bottom wedge generally perpendicularly to the slot of the bottom wedge.

6. The method according to claim 1 wherein one or more fasteners are inserted within an outer wall of the handguard to further secure the outer surface of the barrel nut to the handguard.

7. A method of near permanently joining a handguard firearm to a corresponding upper receiver; the method comprising:
   providing an upper receiver of a firearm having a first end and a second end; the first end having outer edges and an outwardly extending threaded portion;
   providing a handguard having a first end and a second end with a bore therebetween; the second end having outer edges that are configured to closely confront the outer edges of the upper receiver; the bore is configured to receive the outwardly extending threaded portion of the upper receiver; the handguard further configured to include a lower lip at the first end, the lower lip having an angled interior surface;
   providing a barrel nut having a first end and a second end, said second end configured to receive the outwardly extending threaded portion of the upper receiver and the first end configured to receive a barrel of a firearm; the barrel nut having an outer surface at the first end;
   providing a wedge assembly having an upper generally indented surface and a lower angled surface configured to be received and confront the angled interior surface of the lower lip of the handguard;
   securing the second end of the barrel nut to the threaded portion of the upper receiver;
   sliding the wedge into contact with the angled interior surface of the lower lip of the handguard where the two respective angled surfaces closely confront each other;
   positioning the assembly within the lower lip of the handguard with the upper indented surface of the wedge forming a hollow that is configured to closely receive the outer surface of the barrel nut;
   squeezing the outer surface of the barrel nut into the hollow of the handguard; and
   aligning and confronting the two outer edges of the handguard and upper receiver.

8. The method according to claim 7 wherein the outer edges of the respective upper receiver and handguard each include a complementary portion of an aperture that is configured to form one unitary aperture and receive an alignment pin when the two outer surfaces are brought into confronting contact with each other.

9. The method according to claim 7 wherein the upper generally indented surface of the wedge is concave in shape and the outer surface of the barrel nut is cylindrical in shape.

10. The method according to claim 7 wherein one or more fasteners are inserted within an outer wall of the handguard to further secure the outer surface of the barrel nut to the handguard.

* * * * *

UNITED STATES PATENT AND TRADEMARK OFFICE
CERTIFICATE OF CORRECTION

PATENT NO.        : 9,476,673 B2                                     Page 1 of 1
APPLICATION NO.   : 15/059137
DATED             : October 25, 2016
INVENTOR(S)       : Miller et al.

It is certified that error appears in the above-identified patent and that said Letters Patent is hereby corrected as shown below:

On the Title Page

Column 1, item (51), under "Int. Cl.",
      *F41C 23/16*   (2006.01)
delete "*F16B 39/04*   (2006.01)" and
insert -- *F41C 23/16*   (2006.01) --, therefor.

Column 1, item (52), under "U.S. Cl." insert -- USPC.......... 42/75.02 -- after CPC Class.

In the Specification

Column 5, Line 29, delete "outer surface" and insert -- outer surface (e.g., --, therefor.

In the Claims

Column 8, Line 18, Claim 7, delete "handguard" and insert -- handguard of a --, therefor.

Signed and Sealed this
Eighteenth Day of July, 2017

Joseph Matal
*Performing the Functions and Duties of the
Under Secretary of Commerce for Intellectual Property and
Director of the United States Patent and Trademark Office*